(12) United States Patent
Huang

(10) Patent No.: US 12,094,412 B2
(45) Date of Patent: Sep. 17, 2024

(54) ELECTRONIC DEVICE

(71) Applicant: Innolux Corporation, Miaoli County (TW)

(72) Inventor: Sheng-Feng Huang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/193,651

(22) Filed: Mar. 31, 2023

(65) Prior Publication Data

US 2023/0335057 A1 Oct. 19, 2023

Related U.S. Application Data

(60) Provisional application No. 63/331,881, filed on Apr. 18, 2022.

(30) Foreign Application Priority Data

Jan. 13, 2023 (CN) .......................... 202310060798.8

(51) Int. Cl.
*G09G 3/3233* (2016.01)
*H02M 3/155* (2006.01)
(Continued)

(52) U.S. Cl.
CPC .......... *G09G 3/3233* (2013.01); *H02M 3/155* (2013.01); *H05B 45/37* (2020.01); *H05B 45/60* (2020.01); *G09G 3/3258* (2013.01); *G09G 3/3275* (2013.01); *G09G 3/3291* (2013.01); *G09G 2300/0819* (2013.01); *G09G 2300/0842* (2013.01); *G09G 2310/0248* (2013.01);
(Continued)

(58) Field of Classification Search
CPC .. G09G 3/3233; G09G 3/3258; G09G 3/3275; G09G 3/3291; G09G 2320/0233; G09G 2320/043; G09G 2300/0819; G09G 2300/0842; G09G 2310/0248; G09G 2310/0251; G09G 2310/08; G09G 2330/021; H05B 45/60; H05B 45/37; H02M 3/155
USPC ....................................................... 345/212
See application file for complete search history.

(56) References Cited

U.S. PATENT DOCUMENTS

2011/0122119 A1\* 5/2011 Bae ...................... G09G 3/3233
345/211
2015/0294626 A1\* 10/2015 Bi ........................ G09G 3/3233
345/82

(Continued)

FOREIGN PATENT DOCUMENTS

CN 104700778 6/2015

*Primary Examiner* — Tom V Sheng
(74) *Attorney, Agent, or Firm* — JCIPRNET

(57) ABSTRACT

An electronic device includes a substrate, a load element, a power supply circuit, and a compensation circuit. The substrate includes an active area and a peripheral area. The peripheral area is adjacent to the active area. The load element is disposed on the substrate and disposed in the active area. The power supply circuit is disposed on the substrate and disposed in the active area. The power supply circuit is electrically connected to the load element. The compensation circuit is disposed on the substrate and disposed in the peripheral area. The compensation circuit compensates the power supply circuit and/or the load element.

13 Claims, 5 Drawing Sheets

(51) Int. Cl.
  *H05B 45/37* (2020.01)
  *H05B 45/60* (2022.01)
  *G09G 3/3258* (2016.01)
  *G09G 3/3275* (2016.01)
  *G09G 3/3291* (2016.01)

(52) U.S. Cl.
  CPC . *G09G 2310/0251* (2013.01); *G09G 2310/08* (2013.01); *G09G 2320/0233* (2013.01); *G09G 2320/043* (2013.01); *G09G 2330/021* (2013.01)

(56) References Cited

U.S. PATENT DOCUMENTS

| | | | |
|---|---|---|---|
| 2016/0190228 A1* | 6/2016 | Park | H10K 59/1315 |
| | | | 257/40 |
| 2017/0162119 A1* | 6/2017 | Kim | G09G 3/3258 |
| 2017/0213506 A1* | 7/2017 | Shibusawa | G09G 3/3266 |
| 2018/0096654 A1* | 4/2018 | Wang | G09G 3/3233 |
| 2019/0237006 A1* | 8/2019 | Cheng | G09G 3/3225 |
| 2019/0340978 A1* | 11/2019 | Cha | G09G 3/3233 |
| 2020/0074930 A1* | 3/2020 | Lee | G09G 3/3233 |
| 2022/0199018 A1* | 6/2022 | Jeon | G09G 3/3233 |
| 2023/0260462 A1* | 8/2023 | Chen | G11C 19/28 |
| | | | 345/214 |

* cited by examiner

ELECTRONIC DEVICE

CROSS-REFERENCE TO RELATED APPLICATION

This application claims the priority benefit of U.S. provisional application Ser. No. 63/331,881, filed on Apr. 18, 2022, and China application serial no. 202310060798.8, filed on Jan. 13, 2023. The entirety of each of the above-mentioned patent applications is hereby incorporated by reference herein and made a part of this specification.

BACKGROUND

Technical Field

The disclosure relates to an electronic device, and more particularly, to an electronic device including a load element and a compensation circuit.

Description of Related Art

In the conventional technology, a pixel circuit in an electronic device includes a power supply circuit for providing a driving voltage or a driving current to drive a load element. However, transistors included in the power supply circuit may have different threshold voltages due to process variations. As a result, the driving voltage or the driving current is different from an original expected value. Therefore, it is necessary to design a compensation circuit to compensate the power supply circuit.

SUMMARY

The disclosure provides an electronic device having a compensation circuit for compensating a power supply circuit.

An electronic device in the disclosure includes a substrate, a load element, a power supply circuit, and a compensation circuit. The substrate includes an active area and a peripheral area. The peripheral area is adjacent to the active area. The load element is disposed on the substrate and disposed in the active area. The power supply circuit is disposed on the substrate and disposed in the active area. The power supply circuit is electrically connected to the load element. The compensation circuit is disposed on the substrate and disposed in the peripheral area. The compensation circuit compensates the power supply circuit.

A compensation circuit in the disclosure includes a precharge unit, a sampling unit and a detection unit. The precharge unit includes a first terminal, a second terminal, and a control terminal. The first terminal of the precharge unit is electrically connected to a first voltage, the second terminal of the precharge unit is electrically connected to a data line, and the control terminal of the precharge unit is electrically connected to a first control signal. The sampling unit includes a first terminal, a second terminal, and a control terminal. The second terminal of the sampling unit is electrically connected to the second terminal of the precharge unit, and the control terminal of the sampling unit is electrically connected to a second control signal. The detection unit includes a first terminal, a second terminal, and a control terminal. The second terminal of the detection unit is electrically connected to the control terminal of the detection unit and the first terminal of the sampling unit, and the first terminal of the detection unit receives a data voltage during the sampling period.

In order for the aforementioned content to be more comprehensible, embodiments accompanied with drawings are described in detail below.

DETAILED DESCRIPTION OF DISCLOSED EMBODIMENTS

Figure 1:
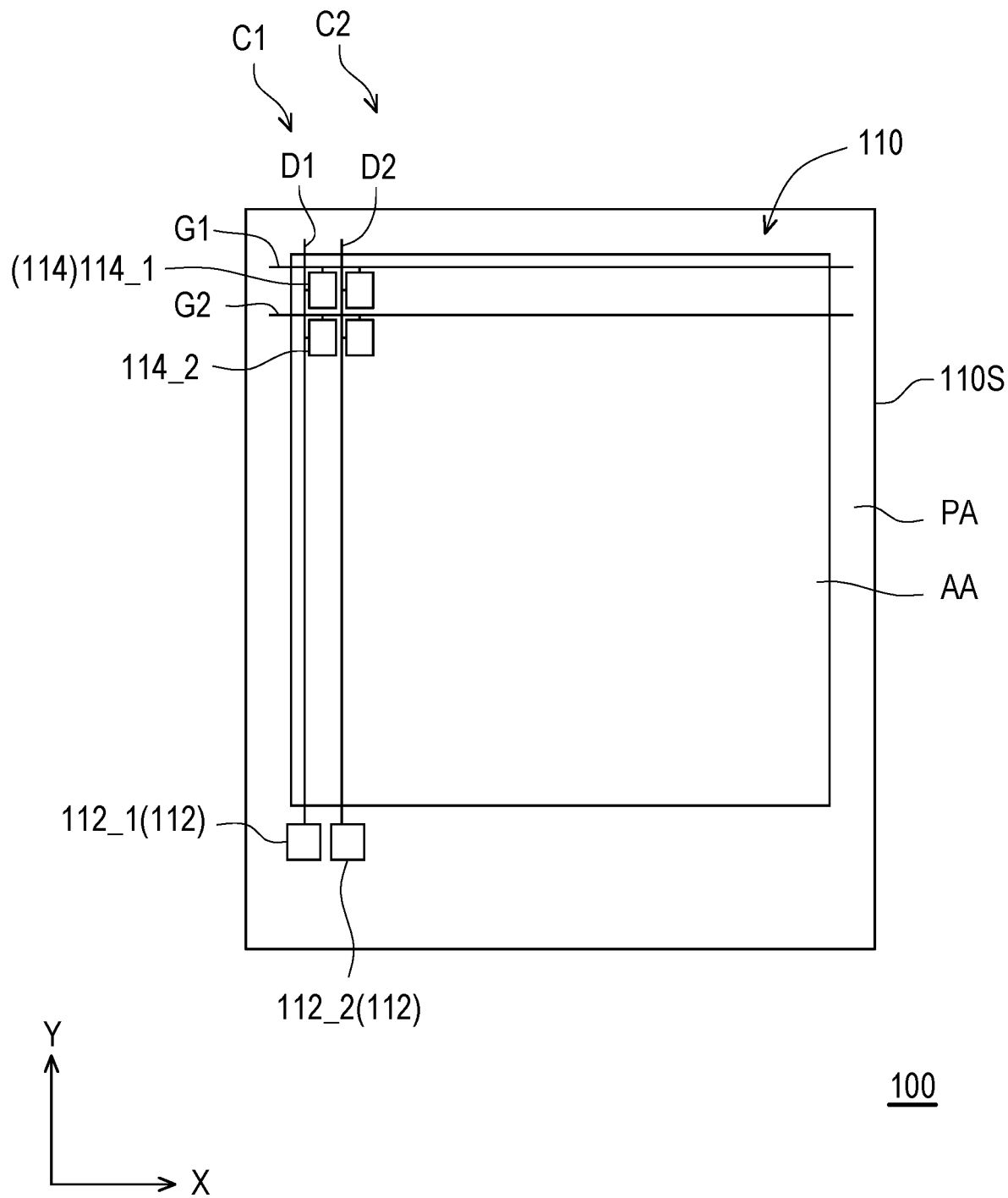
FIG. 1 is a schematic diagram of an electronic device according to an embodiment of the disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific elements in the drawings are not drawn according to actual scale. In addition, the number and size of each element in the drawings are only for exemplary purpose, and are not intended to limit the scope of the disclosure.

In the following description and claims, the terms "contain" and "include" are open-ended terms, so they should be interpreted as "include but not limited to . . . ".

It should be understood that although the terms first, second, third . . . can be used to describe a variety of components, the components are not limited by this term. This term is only used to distinguish a single component from other components in the specification. Different terminologies may be adopted in claims, and replaced with the first, second, third . . . in accordance with the order of components specified in the claims. Therefore, in the following description, the first component may be described as the second component in the claims.

In some embodiments of the disclosure, terms such as "connected", "interconnected", etc. regarding bonding and connection, unless specifically defined, can mean that two structures are in direct contact, or that two structures are not directly in contact, where there are other structures disposed between the two structures. Moreover, the terms of joining and connecting can also include the case where both structures are movable or both structures are fixed. In addition, the term "coupled" refers to any direct and indirect electrical connection. In the case of direct connection, end points of the elements on two circuits are directly connected or connected to each other by a conductor line, and in the case of indirect connection, there are switches, diodes, capacitors, inductors, resistors, other suitable elements, or a combination of the above-mentioned elements between the end points of the elements on the two circuits, but the disclosure is not limited thereto.

The electronic device in the disclosure may include a display apparatus, an antenna apparatus, a sensing apparatus, a light emitting apparatus, or a splicing apparatus, but the disclosure is not limited thereto. The electronic device may include a bendable or flexible electronic device. The electronic device may include electric elements. The electronic device includes, for example, a liquid crystal layer or a light emitting diode (LED). The electronic device may include a passive device and an active device, such as capacitors, resistors, inductors, variable capacitors, filters, diodes, transistors, sensors, MEMS, liquid crystal chips, controllers, etc., but the disclosure is not limited thereto. The diodes may include light emitting diodes or photodiodes. The light emitting diode may include, for example, an organic light emitting diode (OLED), a mini light emitting diode (mini LED), a micro light emitting diode (micro LED), a quantum dot light emitting diode (quantum dot LED), fluorescence, phosphor, other suitable materials, or a combination of the above, but the disclosure is not limited thereto. The sensors may, for example, include capacitive sensors, optical sensors, electromagnetic sensors, fingerprint sensors (FPS), touch sensors, antennas, pen sensors, etc., but the disclosure is not limited thereto. The controller may include, for example, a timing controller, etc., but the disclosure is not limited thereto. Hereinafter, the display apparatus will be used as the electronic device to illustrate the disclosure, but the disclosure is not limited thereto.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Figure 2:
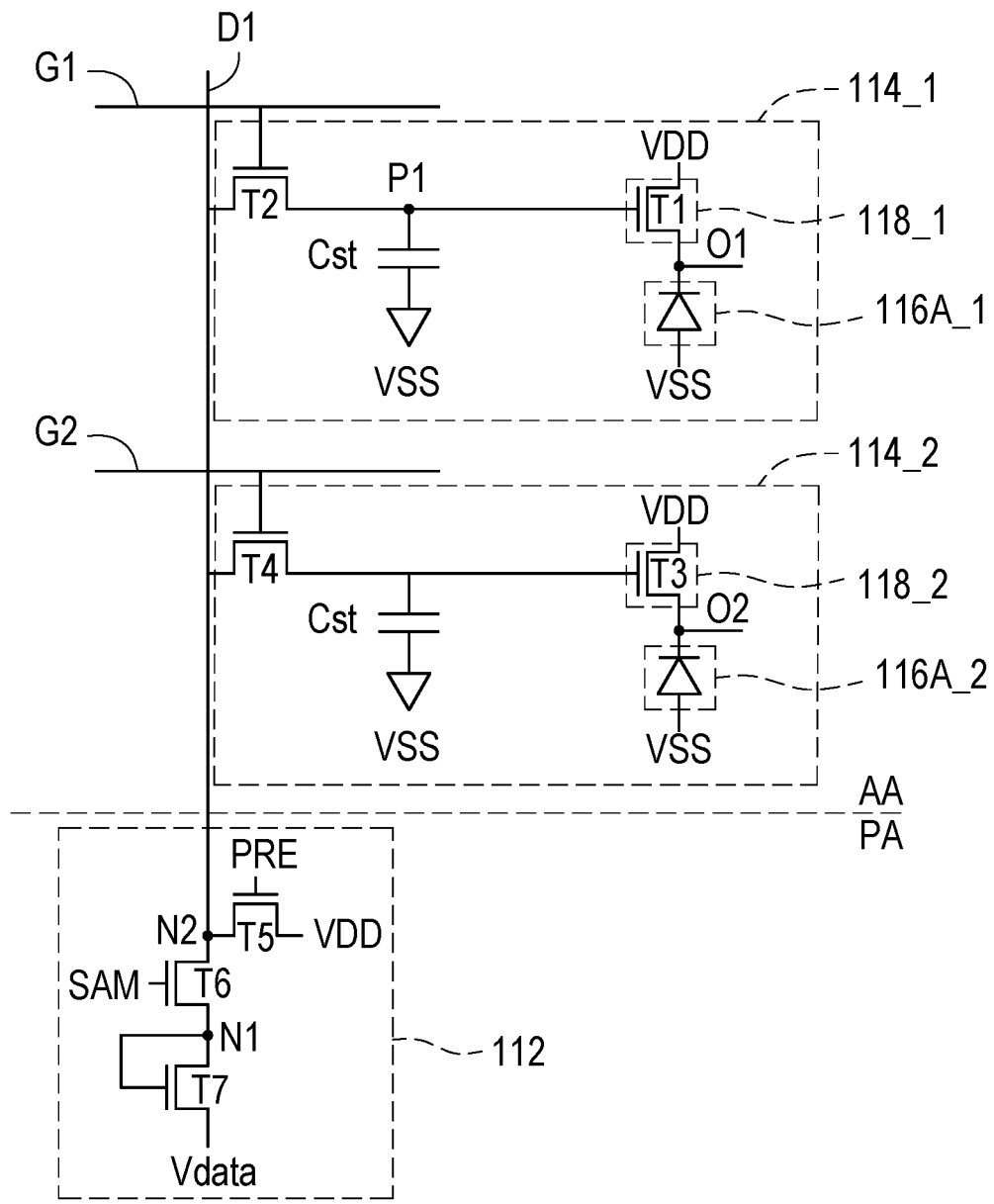
FIG. 2 is a schematic diagram of a pixel circuit and a compensation circuit in the embodiment of FIG. 1.

FIG. 1 is a schematic diagram of an electronic device according to an embodiment of the disclosure. FIG. 2 is a schematic diagram of a pixel circuit and a compensation circuit in the embodiment of FIG. 1. Referring to FIG. 1 and FIG. 2, an electronic device 100 includes a substrate 110 and a compensation circuit 112. The substrate 110 includes an active area AA and a peripheral area PA. The peripheral area PA is adjacent to the active area AA. The compensation circuit 112 is disposed on the substrate 110 and disposed in the peripheral area PA. For example, the active area AA may be disposed at a center of the substrate 110, and the peripheral area PA may be disposed at an edge of the substrate 110 (the disclosure is not limited thereto). In detail, compared with the active area AA, the peripheral area PA may be closer to a side 110S of the substrate 110. According to some embodiments, the active area AA may be an area where electromagnetic waves are emitted and received. For the convenience of illustration, FIG. 1 only shows the compensation circuit 112 including compensation circuits 112_1 and 112_2.

As shown in FIG. 1, the electronic device 100 further includes multiple scan lines G1 and G2, multiple data lines D1 and D2, and multiple pixel circuits 114, which are disposed on the substrate 110. The pixel circuits 114 may be disposed on the substrate 110 and disposed in the active area AA. The scan lines G1 and G2 may extend along a first direction X, and the data lines D1 and D2 may extend along a second direction Y. The pixel circuits 114 are arranged in an array and electrically connected to the corresponding scan lines and data lines. Taking the data line D1 as an example, the data line D1 is electrically connected to multiple pixel circuits. For example, the data line D1 is electrically connected to the pixel circuits 114 extending along the second direction Y, such as pixel circuits 114_1 and 114_2. The first direction X and the second direction Y are different. For example, the first direction X and the second direction Y may be perpendicular. In FIG. 1, the numbers of scan lines, data lines, compensation circuits, and pixel circuits are only for exemplary purpose, and are not intended to limit the disclosure. For the convenience of illustration, FIG. 1 only shows the two scan lines G1 and G2, the two data lines D1 and D2, the four pixel circuits 114, and the two compensation circuits 112, but the disclosure is not limited thereto. As shown in FIG. 1, the data line D1 is electrically connected to the pixel circuits 114 in a first column C1, such as the pixel circuits 114_1 and 114_2, and is electrically connected to the compensation circuit 112_1. Similarly, the data line D2 is electrically connected to the pixel circuits 114 in a second column C2, and is electrically connected to the compensation circuit 112_2. The columns C1 and C2 extend along the second direction Y respectively.

FIG. 2 further shows an internal circuit structure of the pixel circuits 114_1 and 114_2, and the compensation circuit 112 in FIG. 1. Taking the pixel circuit 114_1 as an example, the pixel circuit 114_1 includes a load element 116A_1 and a power supply circuit 118_1. The load element 116A_1 is disposed on the substrate 110 and disposed in the active area AA. The compensation circuit 112 is disposed on the substrate 110 and disposed in the peripheral area PA. According to some embodiments, the electronic device 100 is applicable to a field of wireless transmission, for example. For example, the electronic device 100 is suitable for the antenna apparatus. The load element 116A_1 may be a communication element, such as a tunable element. For example, the load element 116A_1 may be a varactor (a varicap diode), a radio frequency radiation element, an organic light emitting diode, an inorganic light emitting diode, or a combination thereof. According to some embodiments, specific parameters (e.g. physical parameters) of the tunable element may be adjusted depending on an applied signal. The specific parameters may include, for example, capacitance, inductance, resistance, a dielectric constant, or a combination thereof. According to some embodiments, the electronic device 100 may be the antenna apparatus.

As shown in FIG. 2, the power supply circuit 118_1 is electrically connected to the load element 116A_1. The power supply circuit 118_1 is disposed on the substrate 110 and disposed in the active area AA. In this embodiment, the power supply circuit 118_1 includes a source follower circuit T1. The source follower circuit T1 includes a first terminal O1, a second terminal, and a control terminal P1. The first terminal O1 of the source follower circuit T1 is electrically connected to a first terminal of the load element 116A_1. The second terminal of the source follower circuit T1 is electrically connected to a first voltage VDD. A voltage of the first terminal O1 of the source follower circuit T1 follows a voltage of the control terminal P1 and is provided to the load element 116A_1. The load element 116A_1 includes the first terminal and a second terminal. The first terminal (a cathode) of the load element 116A_1 is electrically connected to the first terminal O1 of the source follower circuit T1. The second terminal (an anode) of the load element 116A_1 is electrically connected to a second voltage VSS. The pixel circuit 114_1 further includes a scan unit T2 and a storage capacitor Cst. Similarly, the pixel circuit 114_2 includes a load element 116A_2, a power supply circuit 118_2, a scan unit T4, and the storage capacitor Cst. The power supply circuit 118_2 includes a source follower circuit T3. The first voltage VDD is greater than the second voltage VSS. The scan units T2 and T4 may be, for example, scan transistors.

As shown in FIG. 2, in this embodiment, the compensation circuit 112 compensates the power supply circuit 118_1 and/or the load element 116A_1. Specifically, the compensation circuit 112 compensates the power supply circuit 118_1 through the data line D1. In detail, the compensation circuit 112 compensates the source follower circuit T1 and the source follower circuit T3. The compensation circuit 112 includes a precharge unit T5, a sampling unit T6, and a detection unit T7. The precharge unit T5 includes a first terminal, a second terminal, and a control terminal. The first terminal of the precharge unit T5 is electrically connected to the first voltage VDD. The second terminal of the precharge unit T5 is electrically connected to the data line D1 at a node N2. The control terminal of precharge unit T5 is electrically connected to a first control signal PRE. The sampling unit T6 includes a first terminal, a second terminal, and a control terminal. The first terminal of the sampling unit T6 is electrically connected to a second terminal of the detection unit T7 at a node N1. The second terminal of the sampling unit T6 is electrically connected to the second terminal of the precharge unit T5 at the node N2. The control terminal of the sampling unit T6 is electrically connected to a second control signal SAM. The detection unit T7 includes a first terminal, the second terminal, and a control terminal. The first terminal of the detection unit T7 receives a data voltage Vdata. The second terminal of the detection unit T7 is electrically connected to the control terminal of the detection unit T7 and the first terminal of the sampling unit T6. In FIG. 2, the source follower circuit T1, the scan unit T2, the precharge unit T5, the sampling unit T6, and the detection unit T7 are illustrated by taking N-type transistors as examples, but the disclosure is not limited thereto.

As shown in FIG. 2, in this embodiment, the data voltage Vdata is received by the detection unit T7 and input to the data line D1 after passing through the sampling unit T6, but the disclosure is not limited thereto. In an embodiment, the data voltage Vdata may also be received by the sampling unit T6 and input to the data line D1 after passing through the detection unit T7. That is, positions of the detection unit T7 and the sampling unit T6 may be exchanged. The disclosure does not limit an order of configuration of the sampling unit T6 and the detection unit T7 in the compensation circuit 112.

Figure 3:
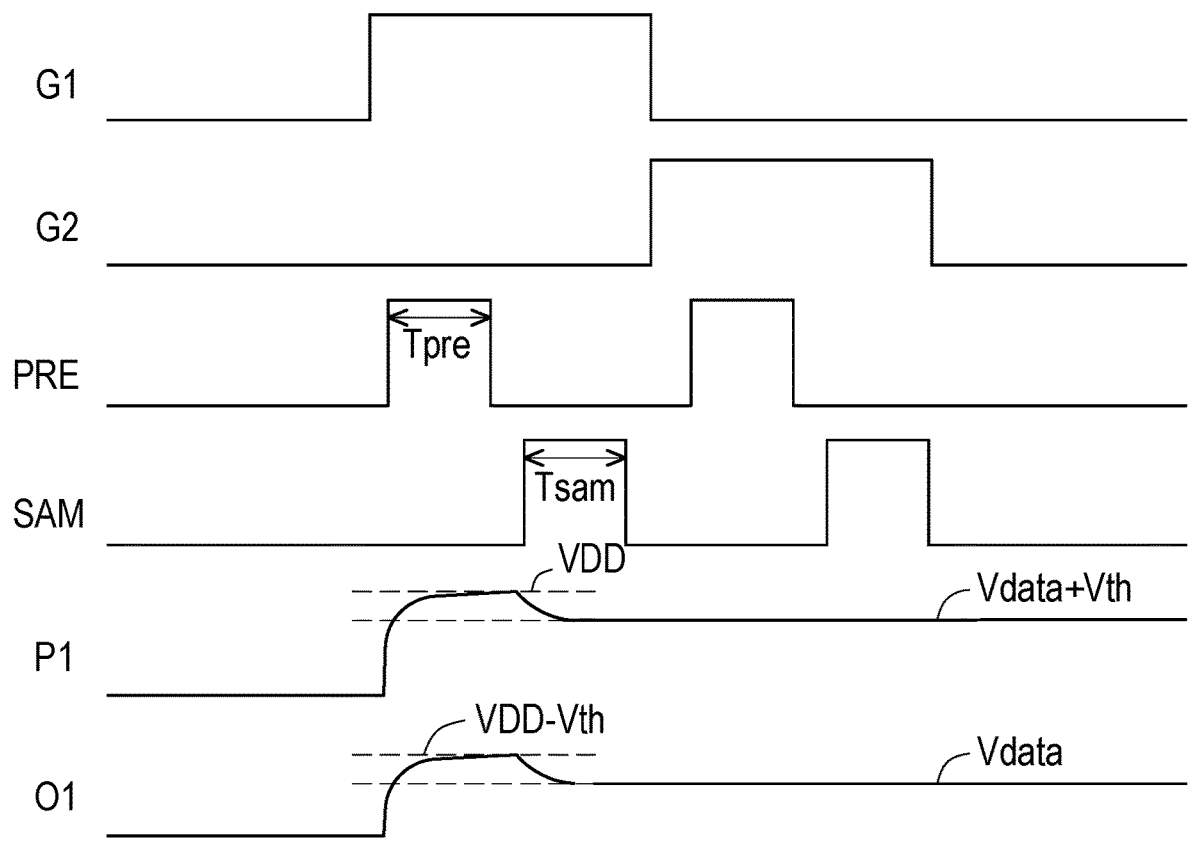
FIG. 3 is a signal waveform diagram during operation of the embodiments of FIG. 1 and FIG. 2.

FIG. 3 is a signal waveform diagram during operation of the embodiments of FIG. 1 and FIG. 2. Referring to FIG. 1 and FIG. 2, FIG. 3 shows signal waveforms on the scan lines G1 and G2, signal waveforms of the first control signal PRE and the second control signal SAM, and signal waveforms on nodes P1 and O1. During a precharge period Tpre, the precharge unit T5 is turned on, and the precharge unit T5 precharges the data line D1 to the first voltage VDD. In addition, when the signal on the scan line G1 is at a high level, the scan unit T2 is turned on. Therefore, a voltage of the node P1 is also precharged to the first voltage VDD during the precharge period Tpre.

Then, during a sampling period Tsam, the first terminal of the detection unit T7 receives the data voltage Vdata. In addition, since the second terminal of the detection unit T7 is electrically connected to the control terminal of the detection unit T7, a voltage of the node N1 is equal to the data voltage Vdata plus a threshold voltage (a critical voltage; Vth) of the detection unit T7. At the same time, during the sampling period Tsam, the sampling unit T6 is also turned on. Therefore, a voltage of the node N2 is equal to the voltage of the node N1, that is, the data voltage Vdata plus the threshold voltage of the detection unit T7. In addition, when the signal on the scan line G1 is at the high level, the scan unit T2 is turned on. Therefore, during the sampling period Tsam, the voltage of the node P1 is equal to the data voltage Vdata plus the threshold voltage Vth of the detection unit T7, marked as Vdata+Vth in FIG. 3, where Vdata is the data voltage, and Vth is the threshold voltage of the detection unit T7. In this embodiment, the first voltage VDD is greater than the data voltage Vdata.

On the other hand, since the voltage of the first terminal O1 of the source follower circuit T1 follows the voltage of the control terminal P1, during the precharge period Tpre, the voltage of the first terminal O1 of the source follower circuit T1 is equal to the voltage of the node P1 (i.e. the first voltage VDD) minus a threshold voltage of the source follower circuit T1. That is, during the precharge period Tpre, the voltage of the first terminal O1 of the source follower circuit T1 is VDD−Vth, as marked in FIG. 3, where Vth is the threshold voltage of the source follower circuit T1. The threshold voltage of the source follower circuit T1 may be designed to be equal to the threshold voltage of the detection unit T7. For example, parameters such as a dielectric thickness and a gate material of transistors of the source follower circuit T1 and the detection unit T7 may be adjusted, and the threshold voltage of the source follower circuit T1 is designed to be equal to the threshold voltage of the detection unit T7. Then, during the sampling period Tsam, the voltage of the first terminal O1 of the source follower circuit T1 is equal to the voltage (that is, Vdata+Vth) of the node P1 minus the threshold voltage of the source follower circuit T1, that is, Vdata+Vth−Vth=Vdata, marked as Vdata in FIG. 3. In this embodiment, an NMOS transistor is used as an example for a transistor type in the circuit, but the disclosure is not limited thereto. In other embodiments, the transistor type in the circuit may also be implemented as a PMOS transistor.

In summary, in this embodiment, through the operation of the compensation circuit 112, the voltage of the first terminal O1 of the source follower circuit T1 may be compensated as Vdata to drive the load element 116A_1. In this way, the voltage of the first terminal O1 of the source follower circuit T1 is not related to the threshold voltage Vth of the transistor, and is not affected by the threshold voltage of the transistor. Therefore, the influence of the threshold voltage of the transistor on the voltage of the first terminal O1 of the source follower circuit T1 may be reduced or avoided. In other words, with the compensation circuit in this embodiment, the influence of the threshold voltage of the transistor on a driving signal (such as a driving voltage) provided to the load element may be reduced or avoided. Similarly, through the operation of the compensation circuit 112, a voltage of a first terminal O2 of the source follower circuit T3 in the pixel circuit 114_2 may also be compensated as Vdata to drive the load element 116A_2.

Figure 4:
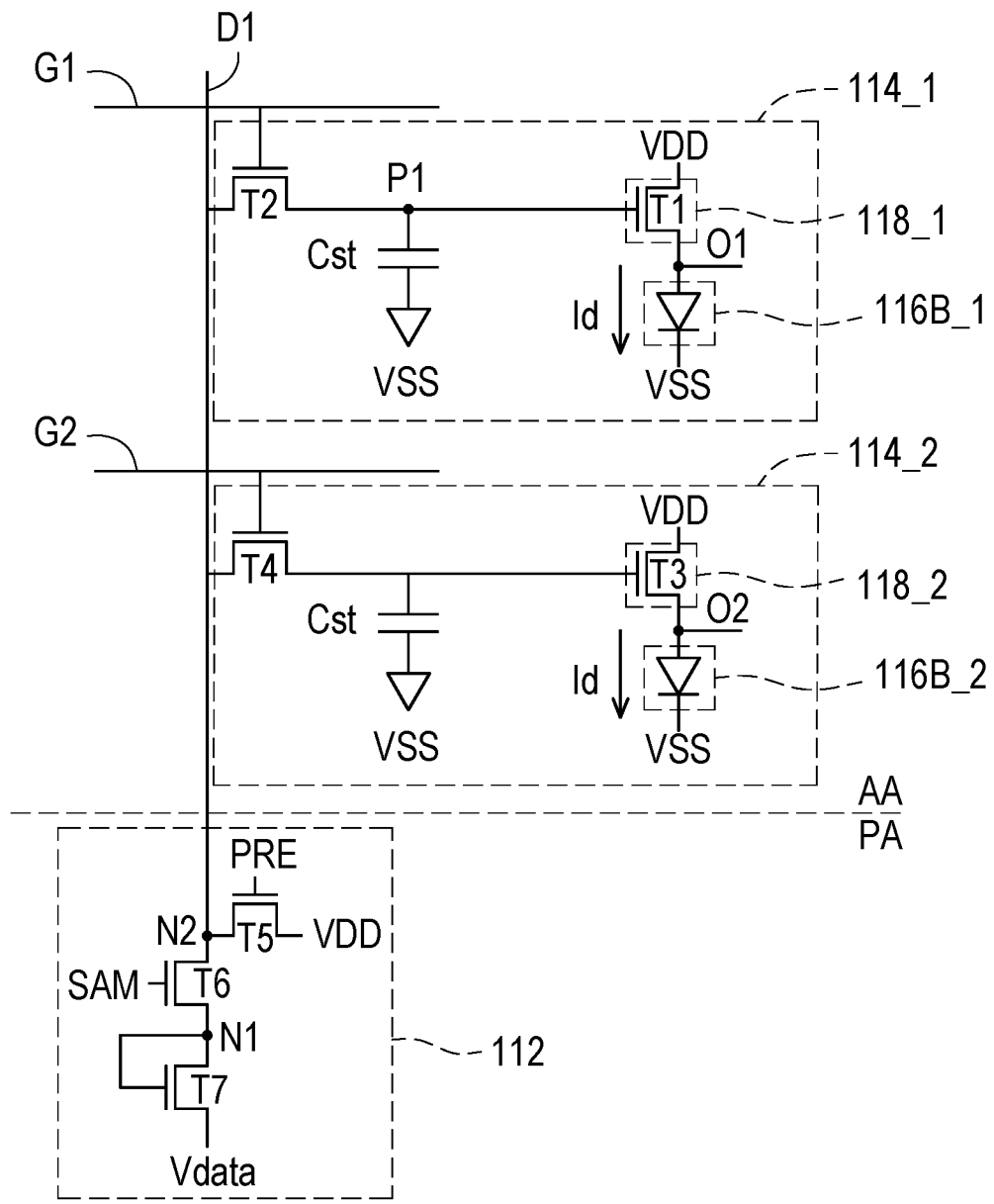
FIG. 4 is a schematic diagram of a pixel circuit and a compensation circuit according to another embodiment of the disclosure.
Figure 5:
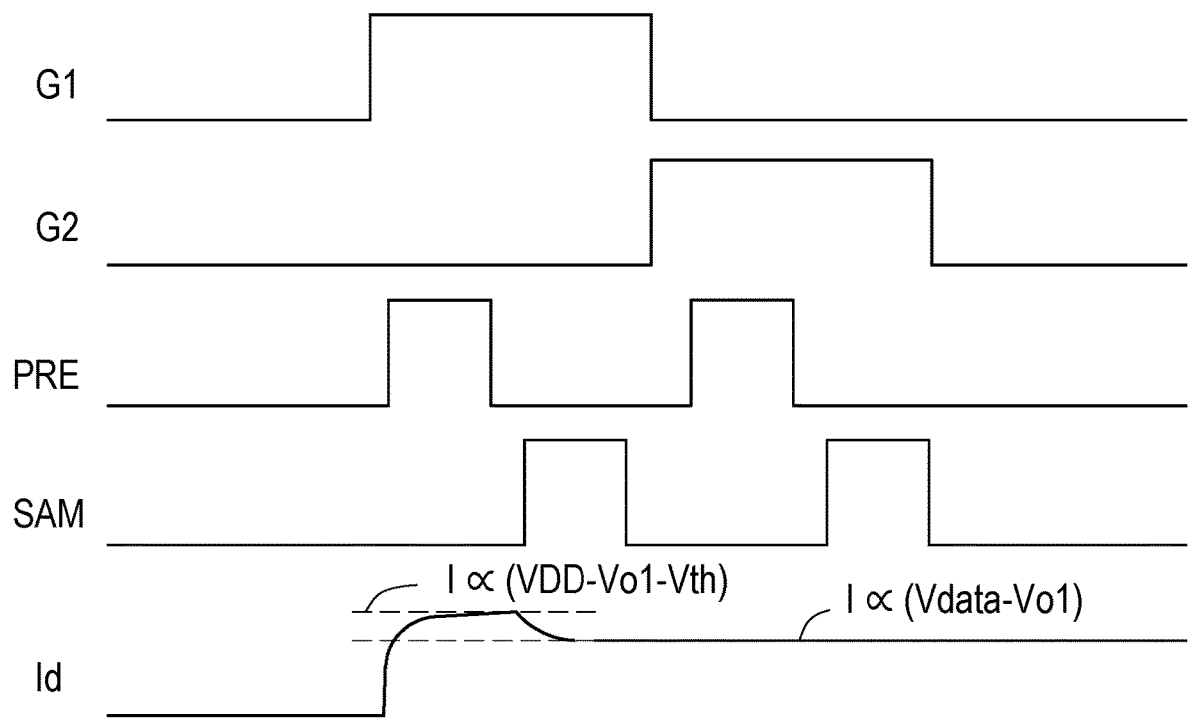
FIG. 5 is a signal waveform diagram during operation of the embodiment of FIG. 4.

FIG. 4 is a schematic diagram of a pixel circuit and a compensation circuit according to another embodiment of the disclosure. FIG. 5 is a signal waveform diagram during operation of the embodiment of FIG. 4. A main difference between this embodiment and the embodiment in FIG. 2 is that load elements 116B_1 and 116B_2 in the pixel circuits 114_1 and 114_2 are light emitting diodes. Specifically, the compensation circuit 112 may compensate a driving current Id for driving the light emitting diodes 116B_1 and 116B_2.

Referring to FIG. 4 and FIG. 5, the load elements 116B_1 and 116B_2 in this embodiment may be organic light emitting diodes or inorganic light emitting diodes. Taking the load element 116B_1 as an example, a first terminal (an anode) of the load element 116B_1 is electrically connected to the first terminal O1 of the source follower circuit T1, and a second terminal (a cathode) of the load element 116B_1 is electrically connected to the second voltage VSS. The driving current Id is used to drive the load element 116B_1 to enable the load element 116B_1 to emit light.

Specifically, during the precharge period Tpre, the precharge unit T5 is turned on, and the data line D1 is charged to the first voltage VDD. Therefore, when the scan unit T2 is turned on, the voltage of the node P1 is also VDD. Since the source follower circuit T1 is used as a driving transistor to control the driving current Id, magnitude of the driving current Id is related to (Vgs−Vth). "Related to" referred here may means proportional relation. During the precharge period Tpre, the magnitude of the driving current Id is related to (Vgs−Vth), that is, related to (VDD−Vo1−Vth), where Vo1 is the voltage of the first terminal (source) O1 of the source follower circuit T1, and Vgs is a voltage difference (VDD−Vo1) between a gate and a source of the source follower circuit T1.

Then, during the sampling period Tsam, the detection unit T7 receives the data voltage Vdata. Therefore, a voltage of the data line D1 at this time becomes the data voltage Vdata plus the threshold voltage Vth of the detection unit T7, that is, Vdata+Vth. As a result, when the scan unit T2 is turned on, the voltage of the node P1 is also Vdata+Vth. The magnitude of the driving current Id is related to (Vgs−Vth). Therefore, during the sampling period Tsam, the magnitude of the driving current Id is related to (Vdata+Vth−Vo1−Vth). That is, the magnitude of the driving current Id is related to (Vdata−Vo1), where Vgs is a voltage difference between the gate and the source of the source follower circuit T1, that is Vdata+Vth−Vo1.

Therefore, the magnitude of the driving current Id is related to (Vdata−Vo1), but not related to Vth. In summary, as shown in FIG. 4 and FIG. 5, in this embodiment, through the operation of the compensation circuit 112, the magnitude of the driving signal (such as the driving current Id) may be compensated to be related to (Vdata−Vo1) to drive the load element 116B_1, but is not related to the threshold voltage Vth of the transistor, and is not affected by the threshold voltage of the transistor. Therefore, the influence of the threshold voltage of the transistor on the driving current Id may be reduced or avoided. Similarly, through the operation of the compensation circuit 112, in the pixel circuit 114_2, the magnitude of the driving current Id may be compensated to be related to (Vdata−Vo1) to drive the load element 116B_2, but is not related to the threshold voltage Vth of the transistor.

Based on the above, in the embodiments of the disclosure, the electronic device includes the load element, the power supply circuit, and the compensation circuit. The load element and the power supply circuit are disposed in the active area of the substrate, and the power supply circuit is electrically connected to the load element. The compensation circuit is disposed in the peripheral area of the substrate. The compensation circuit compensates the power supply circuit and/or the load element to reduce or avoid the driving signal (i.e. the driving voltage or the driving current) provided to the load element being affected by the threshold voltage of the transistor.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, comprising:
a substrate, wherein the substrate comprises an active area and a peripheral area, and the peripheral area is adjacent to the active area;
a load element, disposed on the substrate and disposed in the active area;
a power supply circuit, disposed on the substrate and disposed in the active area, wherein the power supply circuit is electrically connected to the load element; and
a compensation circuit, disposed on the substrate and disposed in the peripheral area, wherein the compensation circuit compensates the power supply circuit,
wherein the power supply circuit comprises a source follower circuit, and the compensation circuit compensates the source follower circuit,
wherein the source follower circuit comprises a first terminal, a second terminal, and a control terminal, the first terminal of the source follower circuit is electrically connected to the load element, and the second terminal of the source follower circuit is electrically connected to a first voltage, wherein a voltage of the first terminal follows a voltage of the control terminal, and is provided to the load element; and
a data line, wherein the compensation circuit compensates the power supply circuit through the data line, and the compensation circuit comprises:
a precharge unit, comprising a first terminal, a second terminal, and a control terminal, wherein the first terminal of the precharge unit is electrically connected to the first voltage, the second terminal of the precharge unit is electrically connected to the data line, and the control terminal of the precharge unit is electrically connected to a first control signal;
a sampling unit, comprising a first terminal, a second terminal, and a control terminal, wherein the second terminal of the sampling unit is electrically connected to the second terminal of the precharge unit, and the control terminal of the sampling unit is electrically connected to a second control signal; and
a detection unit, comprising a first terminal, a second terminal, and a control terminal, wherein the second terminal of the detection unit is electrically connected to the control terminal of the detection unit and the first terminal of the sampling unit, and the first terminal of the detection unit receives a data voltage during a sampling period.

2. The electronic device according to claim 1, wherein the load element is a tunable element.

3. The electronic device according to claim 1, wherein the load element is a varactor.

4. The electronic device according to claim 1, wherein the load element is an organic light emitting diode.

5. The electronic device according to claim 1, wherein the load element is an inorganic light emitting diode.

6. The electronic device according to claim 1, wherein a threshold voltage of the source follower circuit is equal to a threshold voltage of the detection unit.

7. The electronic device according to claim 1, wherein the precharge unit precharges the data line to the first voltage during a precharge period.

8. The electronic device according to claim 1, wherein the sampling unit is turned on during the sampling period.

9. The electronic device according to claim 1, wherein the first voltage is greater than the data voltage.

10. The electronic device according to claim 1, further comprising multiple pixel circuits, disposed on the substrate and disposed in the active area, wherein the multiple pixel circuits of a same column is electrically connected to the compensation circuit via the data line.

11. A compensation circuit, comprising:
a precharge unit, comprising a first terminal, a second terminal, and a control terminal, wherein the first terminal of the precharge unit is electrically connected to a first voltage, the second terminal of the precharge unit is electrically connected to a data line, and the control terminal of the precharge unit is electrically connected to a first control signal;
a sampling unit, comprising a first terminal, a second terminal, and a control terminal, wherein the second terminal of the sampling unit is electrically connected to the second terminal of the precharge unit, and the control terminal of the sampling unit is electrically connected to a second control signal; and
a detection unit, comprising a first terminal, a second terminal, and a control terminal, wherein the second terminal of the detection unit is electrically connected to the control terminal of the detection unit and the first terminal of the sampling unit, and the first terminal of the detection unit receives a data voltage during a sampling period.

12. The compensation circuit according to claim 11, wherein the precharge unit precharges the data line to the first voltage during a precharge period.

13. The compensation circuit according to claim 11, wherein the sampling unit is turned on during the sampling period.

* * * * *